Patented July 25, 1944

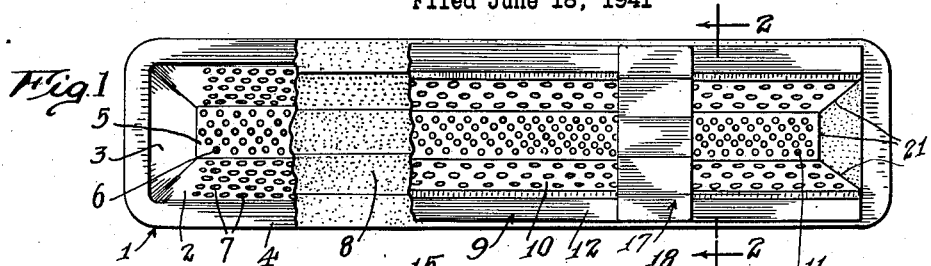

2,354,412

UNITED STATES PATENT OFFICE 2,354,412

STRAINER

Horace J. Walker, Glendale, and Robert R. Settlage, Los Angeles, Calif., assignors to Thos. D. McHale Mfg. Co., Los Angeles, Calif., a corporation of California Application June 18, 1941, Serial No. 398,586

5 Claims. (Cl. 210—158)

This invention relates to strainers, and more particularly to strainers adapted for straining milk or similar fluids.

It has heretofore been the practice to strain milk through strainers like that disclosed in the Thomas D. McHale Patent No. 2,185,512, granted January 2, 1940.

In this type of strainer employing nested members between which there is mounted or positioned a strainer or filtering medium such as cotton, it has been found that the effectiveness of the strainer is limited because of the compression of the filtering material along the upwardly inclined walls so that the filtering is confined substantially to the horizontal bottom portion of the strainer.

It has also been found that in strainers of this type there is a tendency exerted due to the capillarity of the compressed material for the milk or material being strained to travel upward through the compressed filtering material and to drip from the material transversely disposed between the upper nested flanges.

It is an object of this invention to produce a strainer particularly applicable for the straining of milk wherein the filtering material or cotton is so supported between the concentrically disposed elements of the strainer as to increase the efficiency of the strainer enabling the filtering material confined both horizontally and upon the incline to be effective for the filtering.

Another object of this invention is to provide a strainer in which the filtering material is so supported and positioned between concentrically disposed members as to permit the efficient filtering of milk without danger of the milk dripping from the strainer due to its traveling through the filtering material.

Another object of this invention is to provide a strainer particularly applicable for the straining of milk which includes a perforated strainer member and a nested milk-receiving member providing means for holding filtering material in position within and along the perforated section of the strainer member and wherein the milk receiving member is supported with reference to the perforated strainer member upon a pair of longitudinally extending shoulders forming dams.

Other objects and advantages of this invention it is believed will be apparent from the following detailed description of a preferred embodiment thereof as illustrated in the accompanying drawing.

In the drawing:

Figure 1 is a top plan view partly broken away of a strainer embodying our invention.

Figure 2 is a sectional end view taken substantially on the line 2—2 of Figure 1.

Figure 3 is a plan view of the outer perforated member of the strainer.

Figure 4 is a plan view of the inner milk-receiving member embodied in our strainer.

Figure 5 is a perspective view of the drip member embodied in our invention.

In the preferred embodiment of our invention illustrated in the accompanying drawing, 1 indicates an outer perforated strainer member having the inclined side walls 2 and inclined end walls 3 forming a trough and having at their upper edges a retaining flange 4. The side and end walls 2 and 3 terminate in a horizontally disposed bottom 5. The side walls 2 and the bottom 5 are perforated as indicated at 6 and 7.

Mounted within the perforated strainer member 1 and lying closely along the side walls 2 and bottom 5 is a strip of filtering material 8 which is preferably cotton batting. Mounted within the strainer member 1 is a distributing channel member 9. The distributing channel member 9 includes side walls 10, bottom 11, and upper side supporting flanges 12. The flanges 12 are adapted to be seated upon the outwardly extending portion of the cotton batting 8 overlying the flanges 4 of the strainer member 1. The flanges extend inwardly and are formed integral with a downwardly depending wall 13 which terminates in dam feet 14 extending longitudinally the length of the distributing member 9. The feet 14 are joined by the horizontal section 15 to the upper ends of the side walls 10. The dam feet are so formed as to support the distributing member 9 upon the surface of the cotton batting 8 and to compress the cotton batting 8 against the surface of the side walls 2 of the strainer member 1. In this manner a dam is formed through which the milk being filtered does not readily pass due to capillarity. This also acts to maintain the side walls 10 spaced away from the inner surface 16 of the filtering material 8. The bottom 11 of the distributing member 9 is also supported in position elevated away from the upper surface of the filtering material 8.

In order to provide for the distribution of the milk to be filtered throughout the length of the distributing member 9, a drip member 17 may be utilized. The drip member 17 is a fragmental channel member similar to the drip member disclosed in the McHale Patent No. 2,185,512, and includes the supporting flanges 18, inclined side walls 19, and a plane bottom section 20. The drip member 17 is adapted to be slid along the flanges 12 to a position underneath the spout from which the milk or other fluid to be strained is flowing. The structure is such that the bottom 20 lies spaced above the upper surface of the bottom 11 of the distributor member 9 a slight distance so that there is substantially no fall of the milk or fluid in passing off from the drip member 17 to the distributor 9.

The formation of the distributor 9 with the two dam feet 14 is such that there is no lateral shifting of the distributor 9 within the strainer member 1; thus the side walls 10 are maintained a predetermined distance away from the inner surface of the filtering medium 8. The side walls 10 and the bottom 11 of the distributor member 9 are perforated throughout their length to permit free flow of the milk or liquid to be strained against the surface of the filtering medium 8. By this means localized filtering on a restricted section of the filtering medium 8 is avoided.

The distributor member 9 is open at its ends so that the cotton batting or filtering material is held against the end walls 3 by the end edges 21 of the distributor member 9. At this point it is preferable that the filtering material terminate on a plane including the flange 4 at the upper edges of the ends 3 to avoid milk or liquid traveling up the filtering material and over the end flanges.

Having fully described our invention, it is to be understood that we do not wish to be limited to the details herein set forth, but our invention is of the full scope of the appended claims.

We claim:

1. In a strainer for milk or other liquids, the combination of a trough having a perforated bottom, inclined side walls and end walls, filtering material laid over the bottom, side walls and end walls, a distributor member having perforated inclined sides and a perforated bottom section, means carried by the distributor member forming longitudinally extending dam feet along the side walls adapted to compress the filtering material on a line near and below the upper edge of the side walls of the trough and adapted to support the distributor side walls and bottom in spaced relation from the surface of the filtering material.

2. In a strainer for milk or the like, the combination of a trough member including inclined side walls, a bottom section, end walls and a supporting flange, filtering material positioned in the trough member over the bottom, side walls, end walls and supporting flanges, a channel distributor member mounted within the trough member and including a perforated distributing section, and the distributor member being formed to provide longitudinally extending dam feet along the side walls adapted to engage and compress the filtering material against the inner wall of the trough member on a line near and below the upper edge of the inclined sides and said dam feet also acting to maintain the perforated section of the distributor spaced from the side and bottom walls of the filtering material.

3. In a strainer for milk or other liquids, the combination of a trough member having perforated bottom, inclined side walls and end walls, cotton batting laid over the bottom, side walls and end walls, a distributing member having perforated inclined sides and a perforated bottom section, means formed integral with the distributor member forming longitudinally extending dam feet along the side walls adapted to compress the cotton batting on a line near and below the upper edge of the side walls of the trough member and adapted to support the distributor with its side walls and bottom in spaced relation away from the surface of the cotton batting.

4. In a strainer for milk or other liquids, the combination of a trough member having a perforated bottom, side and end walls, filtering material laid over the bottom and side and end walls, a distributing member having a perforated bottom and side walls adapted to be positioned in parallel relation with the side walls and bottom of the trough member, the trough member and the distributing member having cooperating supporting flanges, and the distributor member being formed with longitudinally extending projections on a line near and below the upper end of its side walls and adjacent its supporting flanges providing dam feet along the side walls adapted to engage the filtering material supported on the side walls of the trough member and adapted to support the distributor member within the trough against a lateral shifting therein.

5. In a strainer for milk or other liquids, the combination of a trough member having a perforated bottom and side and end walls, filtering material laid over the bottom and side and end walls, a distributing member having a perforated bottom and side walls adapted to be positioned in parallel relation with the side walls and bottom of the trough member, the trough member and the distributing member having cooperating supporting flanges, the distributor member being formed with longitudinally extending projections on a line near and below the upper end of its side walls and adjacent its supporting flanges providing dam feet along the side walls adapted to engage the filtering material supported on the side walls of the trough member and adapted to support the distributor member within the trough against a lateral shifting therein, and a drip member having cooperating flanges adapted to be supported within the distributor member, the drip member having an imperforate bottom supported in position raised from the bottom section of the distributor member.

HORACE J. WALKER.
ROBERT R. SETTLAGE.